L. SHAW.
WATER SEALED VALVE.
APPLICATION FILED SEPT. 11, 1908.

934,846.

Patented Sept. 21, 1909.
2 SHEETS—SHEET 1.

WITNESSES
R. H. Balderson
W. W. Swartz

INVENTOR
Leonard Shaw,
by Bakewell, Byrnes & Parmelee,
his Attys.

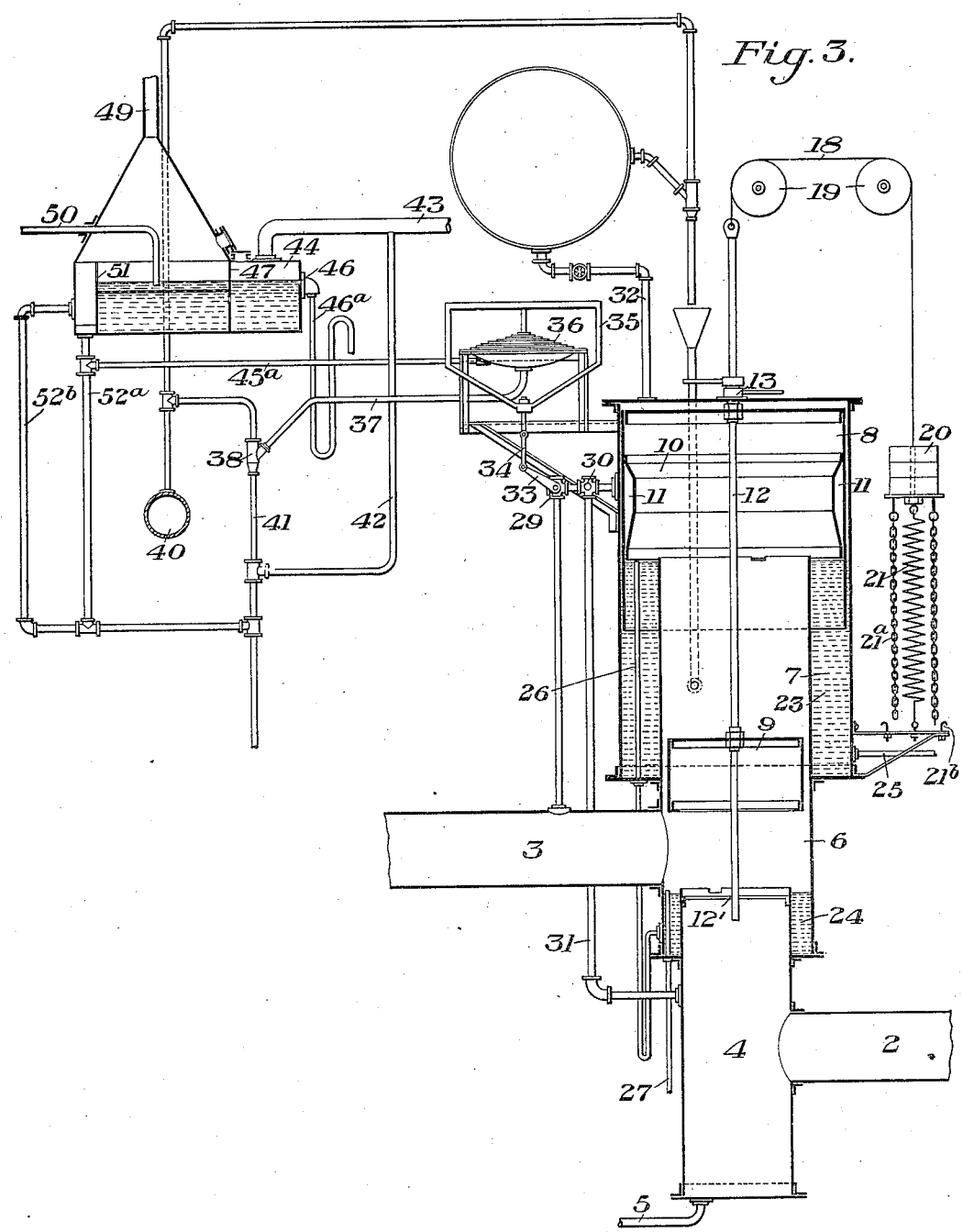

UNITED STATES PATENT OFFICE.

LEONARD SHAW, OF CHICAGO, ILLINOIS.

WATER-SEALED VALVE.

934,846.

Specification of Letters Patent. Patented Sept. 21, 1909.

Application filed September 11, 1908. Serial No. 452,585.

*To all whom it may concern:*

Be it known that I, LEONARD SHAW, of Chicago, Cook county, Illinois, have invented a new and useful Water-Sealed Valve, of which the following is a full, clear, and exact description, reference being had to the accompanying drawings, forming part of this specification, in which—

Figure 1:
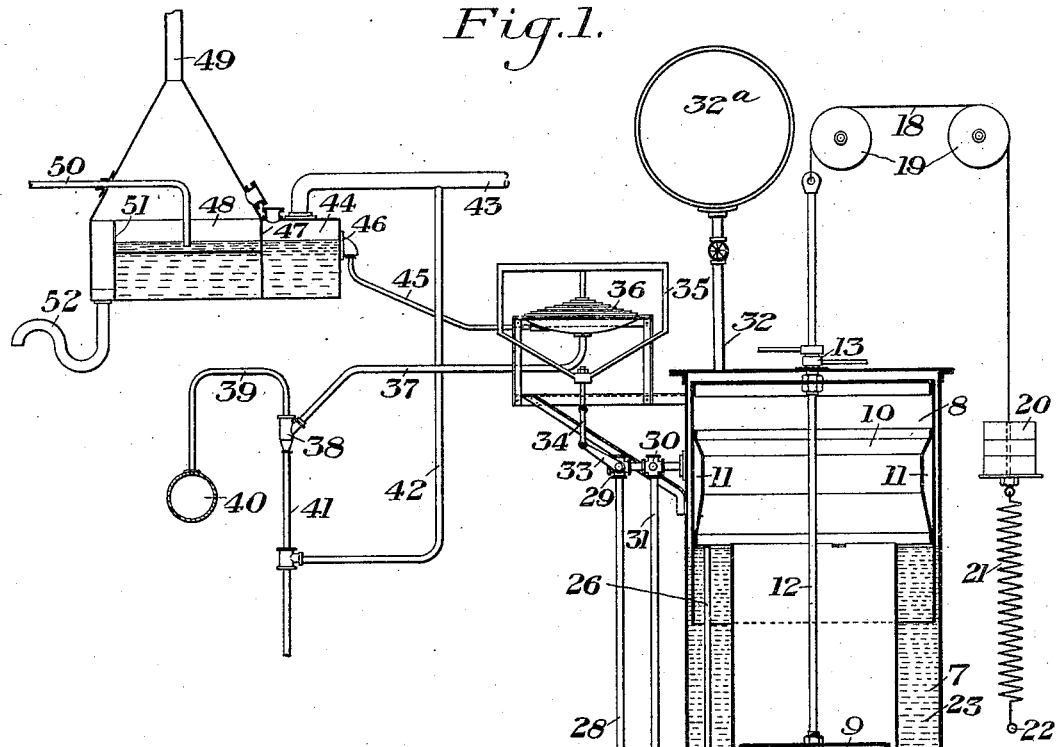
Figure 2:
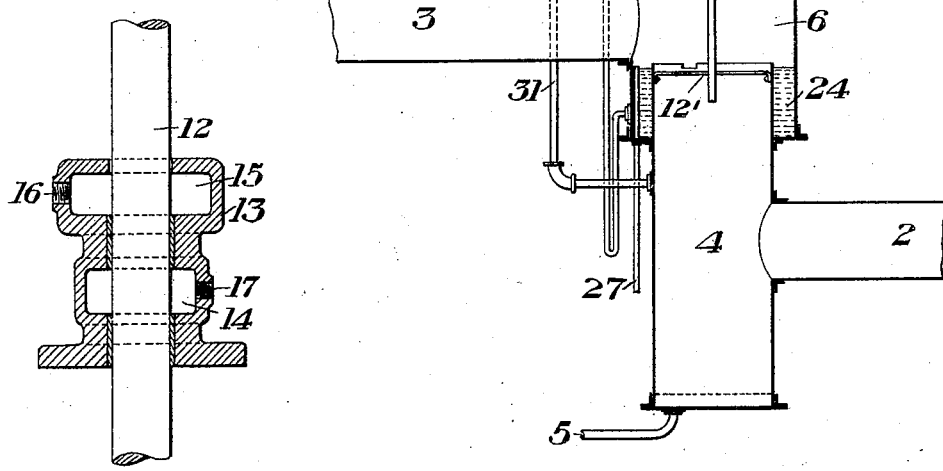

Figure 1 is a sectional elevation of one form of apparatus embodying my invention; Fig. 2 is a detail view showing the fluid packing arrangement for the valve rod or stem; and Fig. 3 is a view similar to Fig. 1 showing a modified form of connections.

My invention has relation to water-sealed valves, and has been more particularly designed to provide a valve of this character for use in connection with gas mains, the object of my invention being to provide a simple and efficient valve arrangement by means of which the flow of gas in the main may be readily controlled, the valve being so constructed and arranged that it may be operated automatically by variations of pressure in the system, or manually, as may be desired.

The precise nature of my invention will be best understood by reference to the accompanying drawing, in which I have shown one embodiment thereof, it being premised, however, that the invention is susceptible of various changes and modifications by those skilled in the art without departing from its spirit and scope as defined in the appended claims.

In these drawings, the numeral 2 designates the outlet branch of a gas main, and the numeral 3 the inlet branch thereof. The branch 2 opens into a chamber 4, which is open at its upper end but is closed at its lower end except for the provision of a waste or drain pipe 5. The chamber 4 extends upwardly into a second chamber 6 closed at its lower end and open at its upper end, which in turn projects upwardly within a valve chamber 7. The inlet branch 3 of the gas main communicates with the lower portion of the chamber 6 above the upper end of the chamber 4. Working within the upper portion of the chamber 7 is a cup-shaped vessel 8 closed at its upper end and open at its lower end, which extends downwardly over the upper portion of the chamber 6. This vessel 8 will be hereinafter referred to as the bell.

9 designates a valve, which is also in the form of a cup-shaped vessel closed at its upper end and open at its lower end, and which is placed within the chamber 6, being therefore of less diameter than the bell 8. Secured within the upper portion of the bell 8 is a shell 10 having its periphery shaped to form the air chamber or compartment 11. This feature of the device may, however, be omitted when desired, as hereinafter more fully explained. The bell 8 and valve 9 are secured to a vertical rod or stem 12, which has a guide 12′ at its lower end portion, and which extends upwardly through a packing box 13 in the top of the casing of the chamber 7. The valve rod or stem extends loosely through this packing box, which is preferably of the form shown in detail in Fig. 2. In this figure it is shown as containing a water inlet chamber 14 surrounding the rod 12 and a waste water chamber 15 above the chamber 14, the latter having an outlet connection at 16 and the former an inlet connection at 17.

To the upper end of the rod or stem 12 is connected a chain or cable 18, which passes over the guide pulleys 19, and to the free end of which is secured a counterweight 20. A spiral spring 21 may also be secured to the counterweight at one end and to a fixed point 22 at its opposite end. The chamber 7 is provided with an annular water-sealing space 23, which surrounds the upper portion of the chamber 6, and which is of sufficient depth to maintain a water seal around the bell 8 at all positions of the valve. The lower portion of the chamber 6 is also provided with a water-sealing space 24 surrounding the upper end of the chamber 4, and which is of sufficient depth to maintain a water seal around the valve only when the valve is closed. The water-sealing space 23 is provided with a water supply pipe 25, and with an overflow pipe 26, the latter communicating at its lower end with the water space 24. The water space 24 is also provided with an overflow pipe 27. A supply of water should preferably run continuously to these water-sealing spaces while the valve is in service. Connected with the branch 3 of the gas main is an equalizing pipe 28, which communicates with the upper portion of the chamber 7 above the water-sealing space, and which is provided with a three-way valve 29. By means of this valve pressure from the pipe 3 may be caused to enter the upper portion of the chamber 7; or the upper portion of the chamber 7 may be connected with the atmosphere. In the arm of the pipe 28, which connects the three-way valve 29 with the chamber 7, is placed a second three-way valve 30, from which a pipe 31 leads into the chamber 4.

If desired, the upper portion of the chamber 7 may be connected to a source of vacuum $32^a$, by means of a pipe 32. The three-way valve 29 may be operated manually, or it may be operated automatically by variations in the pressure in the gas main 2 and 3. For this purpose, I have shown the stem of this valve as having a lever 33, which is connected by a link 34 with the frame 35 of a diaphragm valve 36, the stem of said valve being connected to this frame as shown. Connected with the chamber of this valve is a suction pipe 37, leading to a jet siphon 38 connected by a pipe 39 with a source of water supply such as the main 40. The discharge pipe 41 of this siphon is connected by a pipe 42 with a gas pipe 43 which is connected into the main 3 at any desired point. The gas pipe 43 leads into a relay tank 44, which is closed to the atmosphere, and which is provided with a discharge pipe 45 leading into the chamber of the diaphragm valve. The pipe 45 communicates with the interior of the relay tank 44 by an overflow opening 46. Adjacent to the relay tank 44 and separated therefrom by a partition 47, is a second relay tank 48, which is open to the atmosphere at 49. The relay tank 48 has a water supply pipe 50 and overflow opening 51 communicating with a waste pipe 52.

The operation is as follows:—The counterweights 20 are so adjusted as to balance any desired portion of the weight of the valve, bell and valve rod, this being governed to some extent by the gas pressure carried in the gas system, but will usually be proportioned so that the weight of the valve, bell and valve rod would be sufficiently in excess to close the valve when desired. To lower the valve to its closed position, the three-way valves 29 and 30 are set to equalize the pressure on both sides of the bell, so that the valve will close due to the excess of weight upon the rod over that of the counterweights. In case the pressure under the valve should become materially greater than that above it, it may be convenient to set the three-way valves to equalize the pressure under the valve and above the bell, or this can be taken care of by adjusting the counterweight. To raise the valve, the three-way valves are set to admit atmospheric pressure above the bell. The gas pressure below the bell being sufficiently above that of the atmosphere, the bell and valve will be forced upwardly due to the fact that the area of the bell is in excess of that of the valve. Should the pressure below the valve be below that of the atmosphere for any reason, the three-way valves may be set to equalize the pressure below the valve and above the bell until the valve opens; or the space above the bell may be connected to the source of vacuum $32^a$. When the valve is open and the pressure on both sides of it is equal, the space above the bell may be opened to the atmosphere. In cases of very low pressure, the valve may be assisted in rising by the operator pulling on the counterweights, or by placing the space above the bell in communication with the source of vacuum as described. The air chamber on the bell, or the spring 21, or both, may or may not be employed, as may be desired. Their effect is to produce a throttling effect upon the gas at the lower pressures of gas in the system. As the gas pressure in the system falls to the predetermined minimum, the counterweights having been properly adjusted for this requirement, the valve will commence to lower. As the air chamber becomes immersed in the water seal, or as the tension on the spring 21 increases, or both, the valve will be further counterbalanced, and a greater fall of pressure in the gas system will be necessary to bring the valve to its closed position. By a proper adjustment of the spring 21 the valve will close at a predetermined low pressure and a throttling effect wil be produced before the valve closes. These throttling arrangements may, however, be omitted where the throttling effect is not desired. When the air chamber and spring are omitted, the valve will close automatically at a predetermined low pressure by reason of its weight, the counterweights having been properly adjusted. In case it is desired to maintain the valve in open position at all lower pressures, the valve rod or cable may be secured in fixed position by means of chains $21^a$ and hooks $21^b$, as shown in Fig. 3, or in any other suitable way. When the gas is admitted to the space above the bell, the water supply may be turned into the chamber 14 in the packing box 13 so as to prevent any escape of gas therethrough. The water in this manner forms an efficient packing without undue friction on the valve rod.

The automatic operation of the three-way valve 29 by the arrangement above described, is as follows:—So long as the pressure in the pipe 43 connected with the system is above the minimum, the pressure within the relay tank 44 will be sufficient to prevent any water flowing through the overflow opening 46 into the pipe 45, and the jet siphon 38 will not operate to exhaust the space in the diaphragm chamber to collapse it, thereby keeping the valve 29 in position to hold the valve 9 open. When, however, the pressure in the pipe 43 falls to a sufficient extent to allow the water to rise in the relay tank 44, the water closing the vent through this pipe into the chamber of the diaphragm valve, will cause the jet siphon 38 to exhaust said chamber, and the three-way valve 29 will be actuated to cause the valve 9 to close. The partition 47 between the tanks 44 and 48 has a slot or opening therethrough through which water can flow from one tank into the other. By connecting the pipe 45 to the overflow 51, it will be obvious that the device could be made to operate upon a predetermined increase of pressure in the gas system, or to maintain the diaphragm in a collapsed position until a predetermined low pressure is reached.

In Fig. 3, the pipe 45ª connected to the diaphragm 36 is connected to the waste pipe 52ª of the overflow 51, and the overflow 46 of chamber 44 is provided with a waste pipe 46ª. This overflow 51 is also provided with an excess overflow 52ᵇ. In this case the diaphragm is normally collapsed by means of the siphon 38 when the pressure in tank 44 is below the predetermined point the water will rise therein, which will lower the water in tank 48, and cut off the supply to pipe 52ª which will allow air to rush into the diaphragm chamber to raise it and operate the valve 29, which will allow the bell and its valve 9 to fall, and thereby close the action between the mains 2 and 3.

My invention provides an extremely simple and efficient form of water-sealed valve, which may be made to close automatically upon predetermined variations of pressure in the system which it controls, or which can be operated manually as may be desired.

It will be obvious that various changes may be made in details of construction and arrangement. Thus, the various chambers may be differently arranged; any desired form of valves may be used instead of the three-way valves 29 and 30, and various means operated by changes of pressure in the system may be employed to effect the automatic operation of these valves.

What I claim is:—

1. In apparatus of the character described, the combination with a gas main, of a sealing valve interposed in said main, a bell connected to said valve, a water seal for the valve, a water seal for the bell, and means for controlling the relative pressures acting on both sides of the bell; substantially as described.

2. In apparatus of the character described, the combination with a gas main, of a sealing valve interposed therein, a bell connected to the valve, a water-seal for the valve, a water-seal for the bell, and means for counterbalancing the pressure on both sides of the bell; substantially as described.

3. In apparatus of the character described, a sealing valve, a water seal therefor, a bell connected to the valve, a water seal for the bell, a counterbalance for the bell and valve, and retarding means acting in conjunction with the counterweight upon the seating movement of the valve and bell; substantially as described.

4. In apparatus of the character described, a pressure main, a sealing valve interposed in said main, a bell connected to the valve and having a larger pressure area than the area of the valve, means to supply pressure from the main to the underside of the bell, and means whereby the pressure at opposite sides of the bell may be equalized; substantially as described.

5. In apparatus of the character described, a pressure main, a sealing valve interposed in said main, a bell connected to the valve and having a larger pressure area than the area of the valve, a counterbalance connected to the valve, and means whereby the pressure at opposite sides of the bell may be equalized, to close the valve; substantially as described.

6. In apparatus of the character described, the combination with a pressure main, of a sealing valve interposed therein, a water seal for said valve, a bell connected to the valve, a water seal for the bell, means for equalizing the gas pressure at opposite sides of the bell, and means for equalizing the pressure on the valve and bell; substantially as described.

7. In apparatus of the character described, the combination with a pressure main, of a sealing valve interposed therein, a water seal therefor, a bell connected to the valve, means for equalizing the pressure at opposite sides of the bell, and means for reducing the pressure at one side of the bell to assist in the opening movement of the valve and bell; substantially as described.

8. In apparatus of the character described, the combination with a pressure main, of a sealing valve interposed therein, a bell connected to the valve, water seals for the bell and valve, means for controlling the pressure acting on opposite sides of the bell to assist in seating and unseating the valve, and a counterweight connected to the valve and bell; substantially as described.

9. In apparatus of the character described, the combination with a pressure main, of a sealing valve interposed therein, a bell connected to the valve, water seals for the bell and valve, means for controlling the pressure acting on the bell to assist in seating and unseating the valve, a counterweight connected to the valve and bell, and a spring connected to the counterweight; substantially as described.

10. In apparatus of the character described, the combination with a pressure main, a sealing valve therefor, and a bell connected to the valve, of means for controlling the pressure acting on the bell, such means comprising a valve and an actuating device therefor arranged to operate the valve upon variations of pressure in the pressure main; substantially as described.

11. In apparatus of the character described, the combination with a pressure main, a sealing valve therefor, a bell connected to the valve, and a passage connecting the bell chamber with the pressure main, of a valve controlling said passage, a diaphragm device connected to said valve, and means operative by variations of pressure in the pressure main for actuating said diaphragm device to control the operation of said valve; substantially as described.

12. In apparatus of the character described, the combination of a pressure main, a sealing valve therefor, a bell connected to the valve, and a passage connecting the bell chamber with the pressure main, of a valve controlling such passage, a diaphragm device connected to said valve, a siphon device for controlling the action of the diaphragm device, and means controlled by variations of pressure in the pressure main for controlling the action of the siphon; substantially as described.

13. In apparatus of the character described, the combination of a pressure main, a sealing valve therefor, a bell connected to the valve, a water seal for the bell, means for equalizing the pressure at opposite sides of the bell, a rod or stem connecting the bell and valve, and a fluid packing device for said rod or stem; substantially as described.

In testimony whereof, I have hereunto set my hand.

LEONARD SHAW.

Witnesses:
D. V. MEDALIE,
W. J. PATTERSON.